United States Patent [19]

Tsunoda

[11] Patent Number: 4,587,577
[45] Date of Patent: May 6, 1986

[54] TAPE POSITION DATA RECORDING AND REPRODUCTION METHOD

[75] Inventor: Taiji Tsunoda, Saitama, Japan

[73] Assignee: Pioneer Electronic Corporation, Tokyo, Japan

[21] Appl. No.: 700,237

[22] Filed: Feb. 11, 1985

[30] Foreign Application Priority Data

Feb. 10, 1984 [JP] Japan .................................. 59-21861
Feb. 24, 1984 [JP] Japan .................................. 59-32672
Feb. 29, 1984 [JP] Japan .................................. 59-36088

[51] Int. Cl.⁴ ............................................. G11B 27/30
[52] U.S. Cl. ...................................... 360/72.2; 360/18; 360/47
[58] Field of Search ....................... 360/18, 47, 69, 71, 360/72.1, 72.2, 74.1, 74.4

[56] References Cited

U.S. PATENT DOCUMENTS

| 4,216,492 | 8/1980 | Schmalz | 358/16 |
| 4,321,635 | 3/1982 | Tsuyuguchi | 360/72.2 |
| 4,428,074 | 1/1984 | Abe et al. | 369/32 |
| 4,496,993 | 1/1985 | Sugiyama et al. | 358/335 |
| 4,506,342 | 3/1985 | Yamamoto | 364/900 |

FOREIGN PATENT DOCUMENTS

| 0085517 | 8/1983 | European Pat. Off. | 360/47 |
| 57-50374 | 3/1982 | Japan | 360/18 |
| 57-50375 | 3/1982 | Japan | 360/18 |

Primary Examiner—George G. Stellar
Attorney, Agent, or Firm—Sughrue, Mion, Zinn, Macpeak & Seas

[57] ABSTRACT

A tape position data recording and reproduction method whereby the start points of all programs recorded on the tape can readily be determined merely by playing the tape for a very short time in the reproduction mode. Position data related to a present program and position data related to all subsequent programs are repeatedly recorded at predetermined positions in digital data recording tracks, which are provided as extensions of the tracks containing the video signal. Once the numerical value indicative of the start position of the desired program has been determined, the tape can readily be advanced to that point.

4 Claims, 9 Drawing Figures

TAPE POSITION DATA RECORDING AND REPRODUCTION METHOD

BACKGROUND OF THE INVENTION

The present invention relates to a tape position data recording method for recording tape position data on a video tape.

In the case where a number of programs have been recorded on a video tape by a video tape recorder (VTR), it is considerably difficult to locate the start of a desired one among the programs.

Heretofore, program search operation have been carried out according to the following three methods:

In accordance with the first method, a blank region is provided between the end of each recorded program and the start of the following recorded program, and the tops of programs are located by detecting the blank regions. In order to specify a program the top of which should be detected, it is necessary to detect the current position in a present program and to externally input the position of the desired program measured therefrom. Therefore, the first method is disadvantageous in that the operation of the VTR is so intricate that the VTR is liable to be operated erroneously, and it is difficult to automatically search among a large number of programs.

In accordance with the second method, cue signals for locating the tops of programs are recorded in a cue track provided along one edge of the tape, or times (hours, minutes and seconds) corresponding to tape lengths from the start end of the tape are recorded successively therein, so that, in the cue search mode, these signals are read to detect the top of a desired program. Detecting the top of a program by using the cue signal only is substantially equivalent to the above-described first method of signal processing, and recording and reading out of these times (hours, minutes and seconds) is not applicable to consumer applications because of its complexity.

In accordance with the third method, VITCs (Vertical Interval Time Codes) are recorded in correspondence to video tracks on the video tape, and the VITC corresponding to the end of a program is specified in a program search operation. The third method is advantageous in that the top of a program can be automatically located, and the top of a number of programs can be detected automatically and successively. However, the third method is still disadvantageous in that, in a video tape recorder, the number of tracks recorded is generally sixty per second in the NTSC system, and accordingly a one-hour recording tape has 216,000 tracks. It is necessary to record an equal number of VITCs in the tracks, and it is necessary for the user to note or remember the count values which are provided in correspondence to the VITCs of the tops of recorded programs. Therefore, such a VTR system may be suitable for professional use but not for consumer use.

SUMMARY OF THE INVENTION

An object of the invention is to eliminate the above-described difficulties accompanying a conventional program search method. More specifically, an object of the invention is to provide a tape position data recording method which makes it easily possible to continuously search for the tops of a number of programs, thus being suitable for general consumer use.

The foregoing and other objects of the invention have been achieved by the provision of a tape position data recording method in which, according to the invention, position data relating to a present program and position data relating to a preceding program or programs are repeatedly recorded in digital data recording tracks on extensions of video tracks containing program information.

Further, a specific feature of the method of the invention, which has been provided to achieve the above-described objects, resides in that a video tape in which, in correspondence to video tracks in which a plurality of programs are recorded by rotary heads, position data related to the present program and position data related to the preceding program or programs are recorded repeatedly and used in such a manner that the present program is reproduced for a predetermined period of time to obtain the position data of the start point of the present program, a calculation is performed according to the position data thus obtained to estimate the position of the start point of a specified program which occurs after the present program, and after the tape is run to the position thus estimated, the tape is subjected to reproduction again. The above-described operations are repeatedly carried out until the position data of the start point of the specified program is obtained. After the position data of the start point of the specified program is obtained, the tape is run to the start point of the specified program according to the position data thus obtained.

DESCRIPTION OF THE PREFERRED EMBODIMENTS

Preferred embodiments of the invention will be described with reference to the accompanying drawings.

Figure 1:
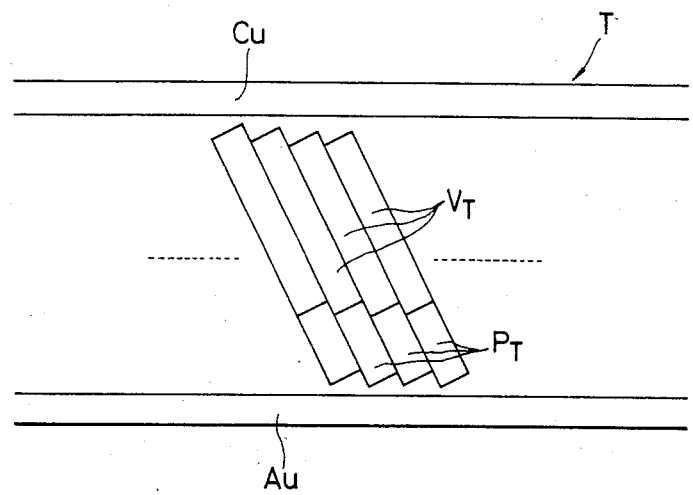
FIG. 1 is a diagram showing the arrangement of tracks on an 8-mm video tape in which tape position data is recorded according to a tape position data recording method of the invention.

FIG. 1 shows the arrangement of tracks on a video tape T in which tape position data is recorded according to a tape position data recording method of the invention. The video tape is one which is loaded in a cassette substantially equal in size to a conventional audio tape compact cassette so as to be used for an 8-mm video tape recorder which can record signals for 90 minutes and is superior in picture quality to a conventional video tape recorder (VTR) and for which a manufacturing standard has been published recently. The tape T, as shown in FIG. 1, has a cue track Cu and an audio track Au along opposite edges of the tape.

Figure 2:
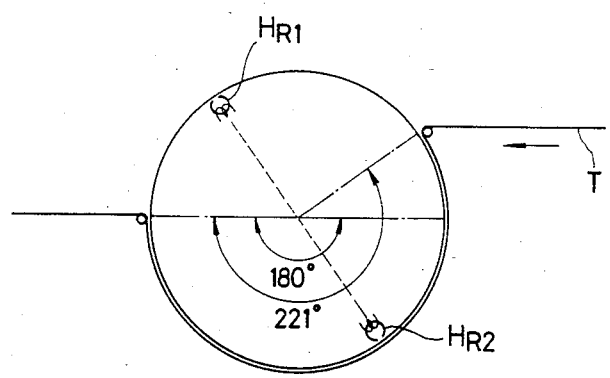
FIG. 2 is an explanatory diagram showing positional relationships between the video tape and rotary heads.

Stationary heads are provided for these tracks. Video tracks $V_T$ and PCM tracks $P_T$ are provided between the two tracks Cu and Au in such a manner that they are inclined at a predetermined track angle. The video track $V_T$ is scanned by a rotation of 180° of two rotary heads $H_{R1}$ and $H_{R2}$ as shown in FIG. 2, and the PCM track is scanned by a rotation of about 30° of a further rotation of 41° of the rotary heads. Video signals for one field (one-half frame) can be recorded per video track $V_T$.

Figure 3:
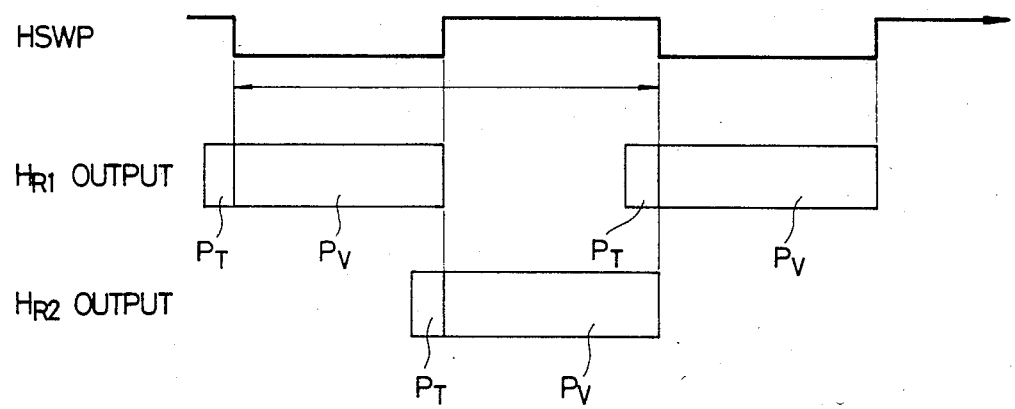
FIGS. 3 and 4 are diagrams for a description of a method of reproducing data recorded on the video tape shown in FIG. 1.
Figure 4:
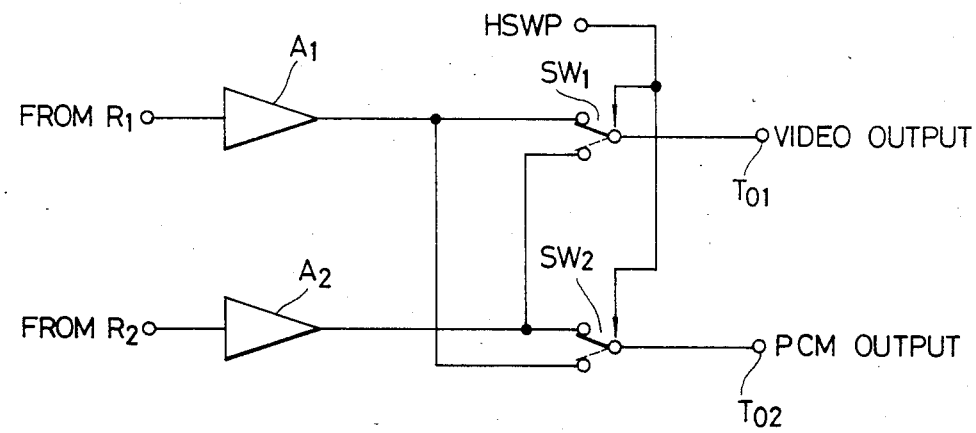

The rotary heads $H_{R1}$ and $H_{R2}$, being separated vertically by a distance of one track length, scan two adjacent tracks with a phase difference of 180°. Therefore, when a head switching pulse HSWP as shown in FIG. 3 is applied to the control input terminals of switches SW1 and SW2 as shown in FIG. 4, from the outputs (FIG. 3) of the rotary heads $H_{R1}$ and $H_{R2}$ applied to the switches SW1 and SW2 through preamplifiers $A_1$ and $A_2$, a video signal and a PCM signal are separately provided at output terminals $T_{01}$ and $T_{02}$, respectively. The armatures of the switches SW1 and SW2 are positioned as indicated by solid lines when the head switching pulse HSWP is at a low level and positioned as indicated by broken lines when the pulse is at a high level. Therefore, as the rotary heads $H_{R1}$ and $H_{R2}$ make one complete revolution, video signals on two adjacent video tracks $V_T$ are successively provided at the output terminal $T_{01}$, and PCM signals on two PCM tracks $P_T$ are provided at the output terminal $T_{02}$.

The above description relates to the case where the signals recorded on the video tape are reproduced. In the case where it is required to record video signals and PCM signals on the video tape, the above-described reproducing operations should be reversed with the signals alternately applied to the rotary heads $H_{R1}$ and $H_{R2}$.

Figure 5:
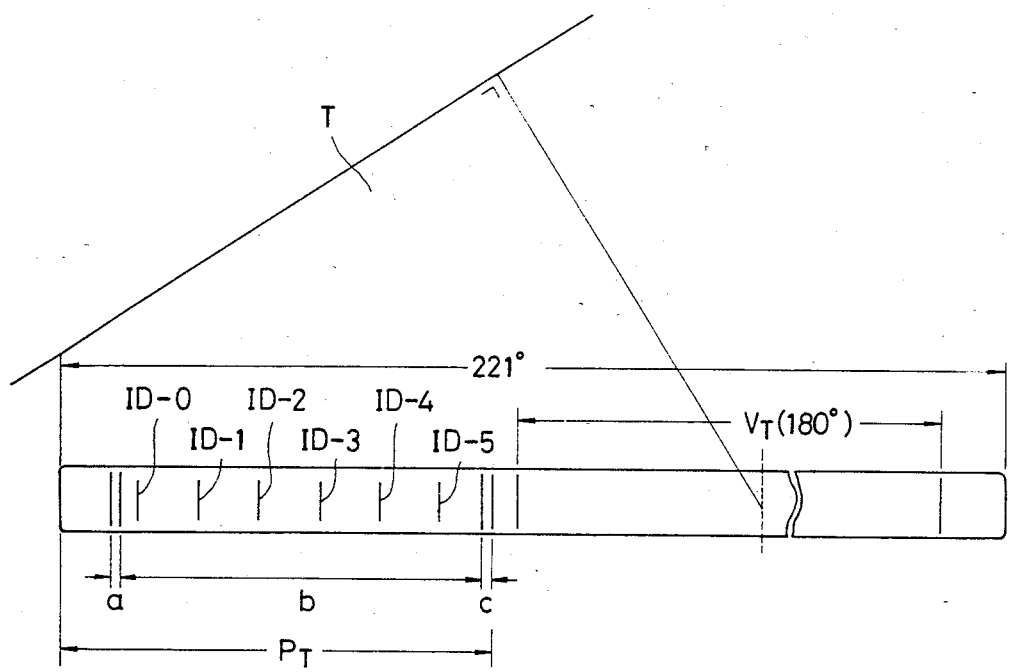
FIG. 5 is an explanatory diagram showing a PCM track in detail.

The PCM track $P_T$, as shown in FIG. 5, includes a clock synchronizing portion a, a data area b, and a margin c. A total of 14,124 bits can be recorded in the data area b. In the data area b, there are provided six index regions ID-0, ID-1, ID-2, ID-3, ID-4 and ID-5. The address of the track can be determined by reading parts of all of the index regions ID-0 through ID-5. Addresses which can be employed include: (1) hours, minutes and seconds expressing the length of a video tape, and a frame number, (2) recording data and time, and (3) a program number. These addresses are selectively recorded in the index regions.

Each of the index regions ID-0 through ID-5 consists of eight bits. When it is required to record a mode defined by a program number and hours, minutes and seconds using these index regions, as indicated in the following Table A, the mode, the program number, the hours, the minutes and the seconds are recorded in the index regions ID-0, ID-1, ID-2, ID-3 and ID-4, respectively, and nothing is recorded in the index region ID-5.

TABLE A

| | | W0 | W1 | W2 | W3 | W4 | W5 | W6 | W7 |
|---|---|---|---|---|---|---|---|---|---|
| ID-0 | Mode | 0 or 1 | | | | 0 or 1 | | | |
| ID-1 | Program No. | Units position (0-9) | | | | Tens position (0-9) | | | |
| ID-2 | Hours | Units position (0-9) | | | | Tens position (0-9) | | | |
| ID-3 | Minutes | Units position (0-9) | | | | Tens position (0-9) | | | |
| ID-4 | Second | Units position (0-9) | | | | Tens position (0-9) | | | |

For instance, Program No. 5 and 1 hour, 15 minutes, 28 seconds are recorded as shown in the following Table B:

TABLE B

| | W0 | W1 | W2 | W3 | W4 | W5 | W6 | W7 |
|---|---|---|---|---|---|---|---|---|
| ID-1 | 1 | 0 | 1 | 0 | 0 | 0 | 0 | 0 |
| ID-2 | 1 | 0 | 0 | 0 | 0 | 0 | 0 | 0 |
| ID-3 | 1 | 0 | 1 | 0 | 1 | 0 | 0 | 0 |
| ID-4 | 0 | 0 | 0 | 1 | 0 | 1 | 0 | 0 |

Figure 6:
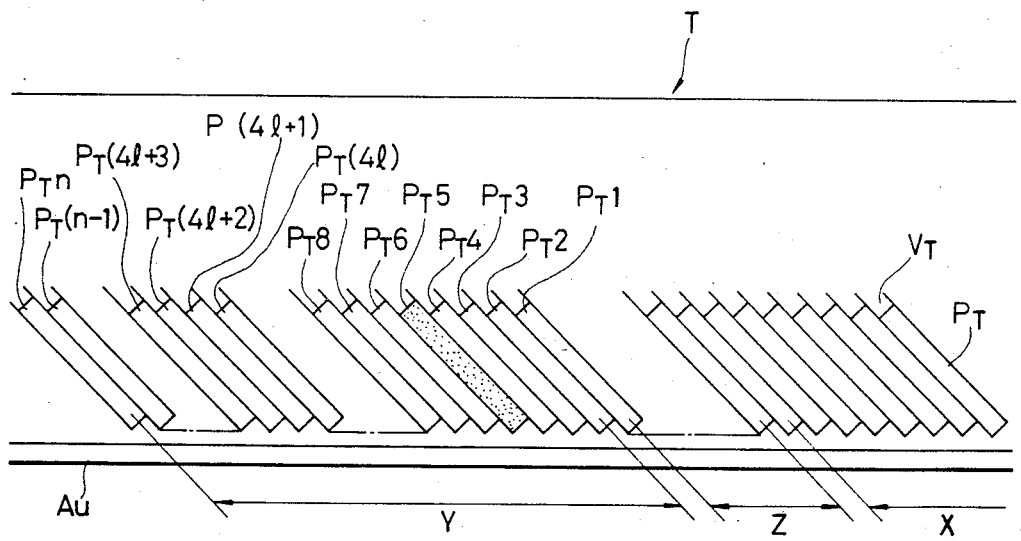
FIG. 6 is an explanatory diagram for a description of a tape position data recording operation according to the method of the invention.

FIG. 6 shows PCM tracks in which tape position data is recorded according to the method of the invention so as to be effectively utilized for searching the top of a program recorded on the tape. The recording is performed using the above-described index regions.

In FIG. 6, reference character X designates an interual in which a number having a program number $m-1$ is recorded; Y, an interval in which a number having a program number m is recorded; and Z, a PCM blank interval of the order of three seconds, for instance, which is provided between the above-described two programs. In general, nothing is recorded in the interval Z.

The number m of the program recorded in the interval Y, and a time (hours, minutes and seconds) corresponding to the distance between the start end of the tape T and the first PCM track $P_{T1}$ in the interval Y provided for the program number are recorded in the first PCM track $P_{T1}$. Thereafter, in every fourth PCM track, the program number m and a time (hours, minutes and seconds) corresponding to the distance between the start point of the program number m and that PCM track are recorded. That is, in the case of FIG. 6, in the PCM tracks $P_{T5}, \ldots P_{T(4k+1)}$ (where k=0, 1, 2 ...) the program number m and times corresponding to the distances to the respective tracks are recorded. In a 60-field recording system, 60 tracks are scanned in one second. Therefore, sometimes the same value of hours, minutes and seconds are recorded in (4k+1) PCM tracks (smaller than 60 PCM tracks); however, thereafter, every sixty tracks, a time (hours, minutes and seconds) added with one second together with the program number m is recorded.

On the other hand, program numbers 1 through $m-1$ and times (hours, minutes and seconds) corresponding to the distance from the start end of the tape to the first tracks of the programs are respectively recorded in the PCM tracks $P_{T2}$, $P_{T3}$ $P_{T4}$, $P_{T6}$, ... in which the program number m is not recorded. That is, the times (hours, minutes and seconds) recorded in the first PCM tracks of the programs Nos. 1 through $m-1$ are repeated as indicated in the following Table C:

TABLE C

| Track | Record |
|---|---|
| $P_{T1}$ | a program number 5, and a time (hours, minutes and seconds) corresponding to the distance from the tape's starting end to the start point of the program |
| $P_{T2}$ | a time (hours, minutes and seconds) corresponding to the distance from the tape's starting end to the start point of the program number 1 |
| $P_{T3}$ | a time (hours, minutes and seconds) corresponding to the distance from the tape's starting end to the start point of the program number 2 |
| $P_{T4}$ | a time (hours, minutes and seconds) corresponding to the distance from the tape's starting end to the start point of the program number 3 |
| $P_{T5}$ | the program number 5, and a time (hours, minutes and seconds) corresponding to the distance from the tape's starting end to the start point of the program |

TABLE C-continued

| Track | Record |
|---|---|
| $P_{T6}$ | a time, (hours, minutes and seconds) corresponding to the distance from the tape's starting end to the start point of the program number 4 |
| $P_{T7}$ | a time (hours, minutes and seconds) corresponding to the distance from the tape's starting end to the start point of the program number 2 |
| $P_{T8}$ | a time (hours minutes and seconds) corresponding to the distance from the tape's starting end to the start point of the program number 3. |
| ... | ... |

The tape position data thus recorded on the tape can be read by running the tape in the VTR in the reproduction mode for a short time. The data read includes the present tape position (hours, minutes and seconds), its program number, and the tape position (hours, minutes and second) of the top of the program whose number precedes that program number. Accordingly, by specifying the program number of a desired program, the top of the program can be automatically detected by, when the program number of the desired program is specified, calculating the amount of tape (hours, minutes and seconds) to be run from the tape position of the program thus specified and the present tape position. According to the amount of the tape thus calculated, an instruction is applied to the VTR to detect the top of the specified program.

In this words, if is assumed that the number of programs recorded on one video tape T is m, and tape position data consisting of hours, minutes and seconds representing tape lengths at the start points of the programs from the start end of the tape are $t_1$ through $t_m$, the present program number, and the tape position data measured from the start end of the tape are recorded, every predetermined number of PCM tracks, in the index regions of the PCM tracks $P_{T1}$ through $P_{Tn}$ which are provided on the extensions of video tracks, for instance, in the interval Y. The program numbers of all programs recorded on the tape and the tape position data of the start points of the programs (which are measured from the start end of the tape) are repeatedly recorded in a predetermined number of PCM tracks between the PCM tracks in which the present program number and the tape position data are recorded as described above.

For instance, in the case where the program number 2 is recorded in the interval Y, the number of the program and the tape position data (hours, minutes and seconds) of the PCM track $P_{T1}$ (measured from the start end of the tape) are recorded in the track, the number m of the program is five, and the predetermined number of PCM tracks is three, the recording is performed as indicated in Table C above.

In order to record the above-described tape position data, it is necessary to provide a memory which can store times (hours, minutes and seconds) corresponding to the tape lengths from the start end of the tape which represent the tape positions of the start points of all the programs including the last program until the programs have been recorded in the tape. Therefore, if when recording the programs on one tape is accomplished, the tape is run in the reverse direction to the tops of the programs according to the contents of the memory, then all the contents of the memory can be automatically recorded in the above-described PCM blank interval Z by after-recording dubbing. The amount of data stored in the memory depends on the number of programs; however, for instance, sixty programs can be recorded by after-recording dubbing for one second (60 tracks).

The tape thus recorded can be loaded in the VTR irrespective of its position. That is, the position data of the tops of the programs which have been recorded before the present position can be obtained by running the tape in the reproduction mode for a short time. If the specified program is included in these programs, then the top of the specified program can be detected immediately by running the tape as described above. Even when a program after that position is specified, the position data of the tops of all the programs can be obtained by running the tape to the point between the present program and the preceding or following program, which permits the tape to be immediately run to the top of the specified program.

Any desired number of programs can be recorded on the tape. Depending on the capacity of the memory, the position data of the tops of, for instance, 100 programs can be recorded between programs by after-recording dubbing for less than two seconds. Therefore, the above-described PCM blank interval should have a length corresponding to about two seconds. A blank interval length of this order will cause no problem in video tape reproduction.

A method of detecting the top of a desired program utilizing the tape position data thus recorded will be described with reference to the flow chart of FIG. 7.

First, a video tape on which position data has been recorded as described above is loaded in the VTR. In Step S1, the tape is wound on the drums of the VTR. In Step S2, the VTR is run in the reproduction mode for about three seconds to read the records in the index regions in the PCM track $P_T$. In Step S3, it is determined whether or not the records have been read out. If the records have been read out, then they are stored in the memory in Step S4. In Step S5, a standby signal is provided to stop the VTR temporarily.

In Step S6, it is determined whether or not a program number has been specified by the operator. If it is determined that a program has been specified, in Step 7 it is determined whether or not data related to the specified program is stored in the memory. If the result of the determination is "Yes", the amount and direction of movement of the tape are calculated from the data in the memory in Step S8. According to the result of the calculation, in Step S9, the tape is run to the predetermined position at a speed ten times as fast as the ordinary speed in the picture search mode; or as indicated by the dotted lines, in Step S9', the "FF" or "REW" button is operated so that the tape is run to an approximate position according to a calculation on a reel rotation detection, and in Step S9'', the tape is run to the predetermined position from the approximate position in the picture search mode or in the reproduction mode.

If, in Step S3, the result of the determination is "No", that is, if no data has been read out of the index regions, in Step S10 the tape is rewound in the picture search mode to the point where the position data is available so that the data in the index regions can be read out. Then, the operation is advanced to Step S4.

If, in Step S7, the result of the determination is "No", that is, if no data related to the specified program is available in the memory, then in Step S12 the tape is run to the nearest after-recording dubbing part according to the data in the memory, and in Step S13 the data there is read and stored in the memory so that the determination in Step S7 is carried out again. The operations in Steps S12 and S13 are repeatedly carried out until the data on the specified program is obtained. After the data is obtained, the calculation in Step S8 is performed.

If not only the position data of the tops of programs but also those of the ends of the programs are recorded, then the after-recording dubbing operation can be achieved more readily. Furthermore, it is also possible to record other information such as a data suitably in the track indicating the present position.

In the above-described embodiment, the position data recorded every predetermined number of PCM tracks consists of the present program number, and a time (hours, minutes and seconds) from the start point of the program. However, instead, a program number and a time (hours, minutes and seconds) representing the tape length from the start end of the tape to a track in which data is going to be recorded may be recorded.

Instead of a time (hours, minutes and seconds) a track number corresponding to the number of PCM tracks from the start end of the tape may be employed as the position data of a program. In this case, the track number has a number of digits, at least six digits, and therefore at least three index regions, for instance, ID-1 through ID-3, must be used to record one track number.

Furthermore, in the above-described embodiment, after-recording dubbing of the position data of programs to the blank interval is carried out for all programs. However, after-recording dubbing of the position data to a blank interval located after a predetermined program may be performed only for programs which come after the predetermined program. The after-recording dubbing may be repeatedly carried out until all tracks in the blank interval are filled.

As is apparent from the above description, according to the method of the invention, the position data of the present program and those of the previous programs are repeatedly recorded in the digital data recording tracks on extensions of the video tracks where the programs have been recorded.

Accordingly, by running the tape in the reproduction mode only for a very short time, the tape position data necessary for locating the tops of all programs can be readily obtained, which makes it possible to perform a continuous program search operation to locate the tops of a number of programs. Therefore, the program search operation can be performed automatically and readily merely by storing or recording program numbers (generally two digits) instead of a number of digits representing, for instance, times (hours, minutes and seconds) of programs, as a result of which the user can operate the VTR more readily. If the position data of programs is recorded in the PCM tracks between programs in which no data has been recorded, then the program search operation can be achieved more readily.

It should be noted that it might be unnecessary to record the data representing the position of the tape from the start end thereof together with the present program number but it may be allowed to record the tape position data from the start end of the program.

Figure 8:
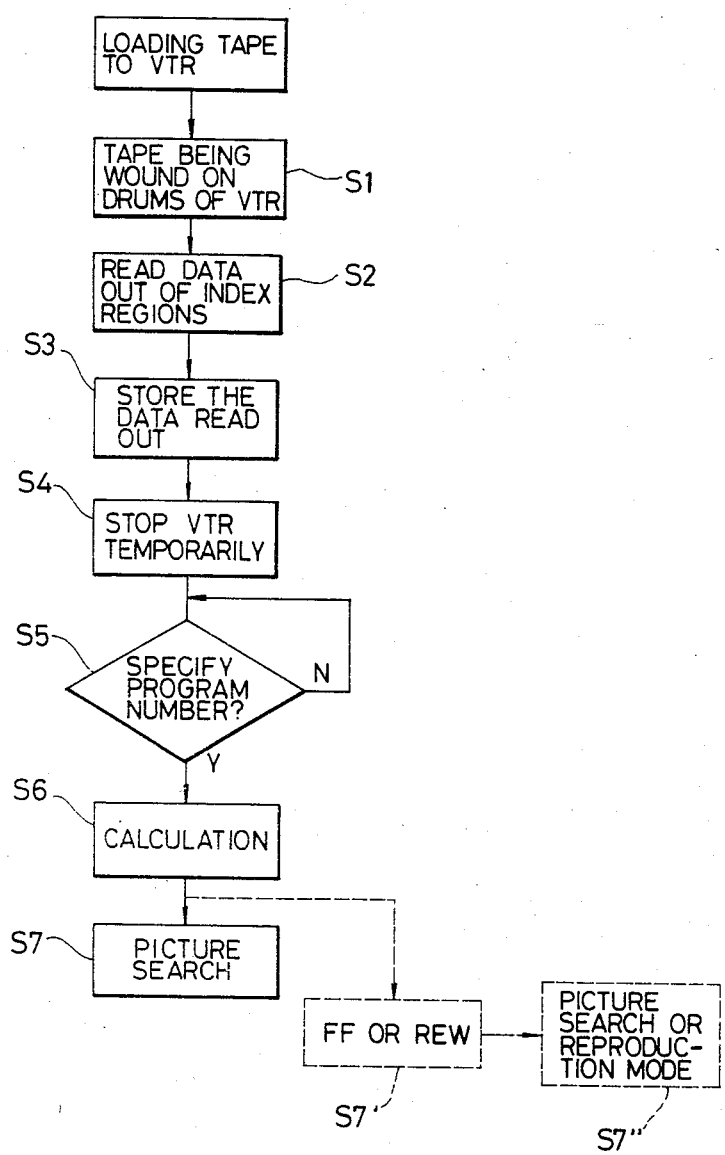
FIGS. 8 and 9 are flow charts which are modifications of the flow chart of FIG. 7.

An alternate method of detecting the top of a desired program by utilizing the tape position data recorded as described above will be described with reference to the flow chart of FIG. 8 in detail.

First, a video tape in which the position data has been recorded is loaded in the VTR. In Step S1, the tape is wound on the drums of the VTR. In Step S2, the VTR is run in the reproduction mode for about three seconds to read the data from the index regions of the PCM tracks. In Step S3, the data thus read is stored in the memory. In Step S4, a standby signal is produced to stop the VTR temporarily.

In Step S5, it is determined whether or not the operator has specified a program number. If the result of the determination is "Yes", then in Step S6 the data related to the program thus specified is obtained from the memory and then the amount and direction of movement of the tape are calculated. According to the result of the calculation, in Step S7, the tape is run to the predetermined position at a speed ten times as fast as the ordinary speed in the picture search mode; or as indicated by the dotted lines, in Step S7', the "FF" or "REW" button is operated so that the tape is run to an approximate position according to a calculation on a reel rotation detection, and in Step 7", the tape is run to the determined position from the approximate position in the picture search mode or in the reproduction mode.

Figure 7:
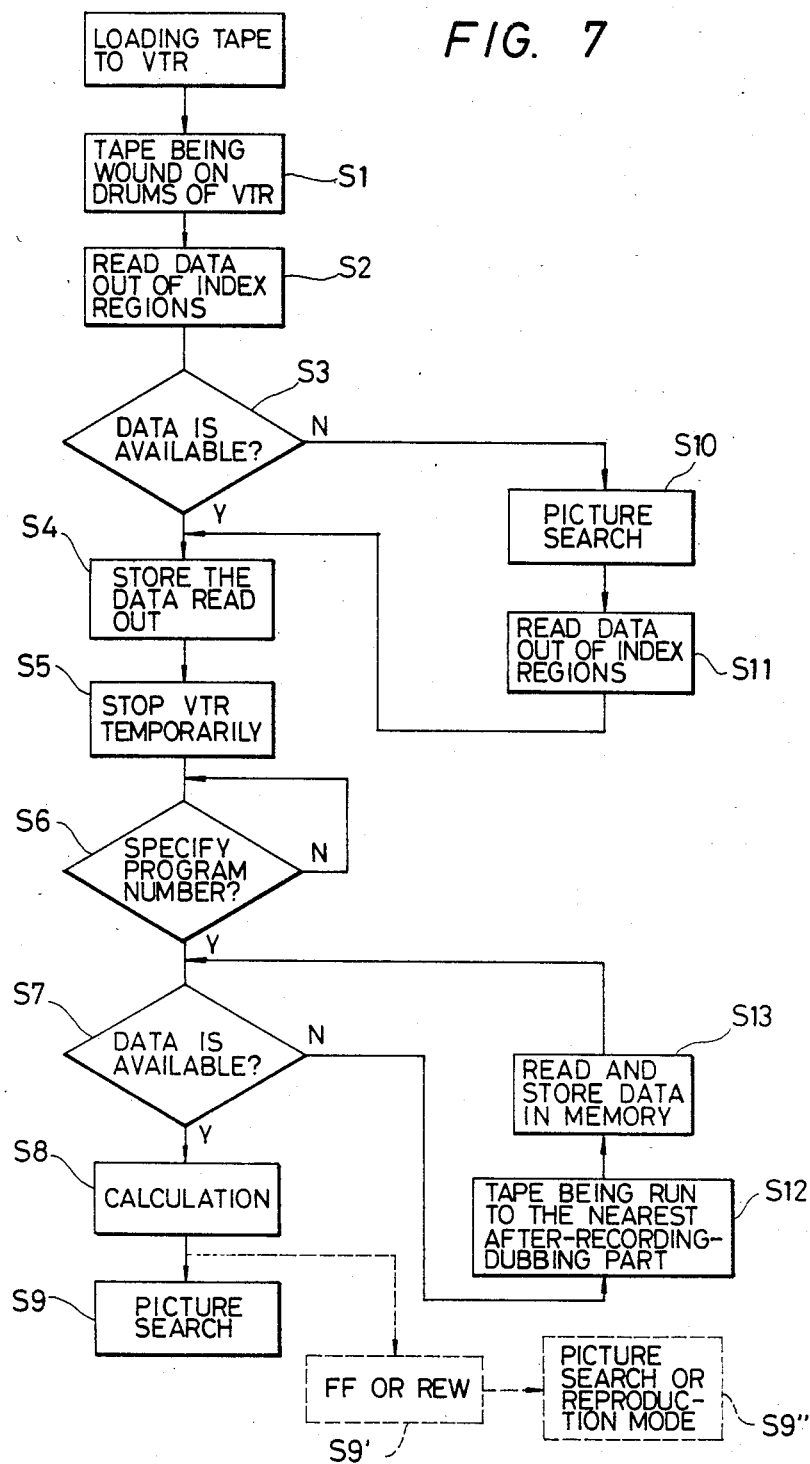
FIG. 7 is a flow chart showing operational steps for detecting the tops of programs by the utilization of data recorded according to the invention.
Figure 9:
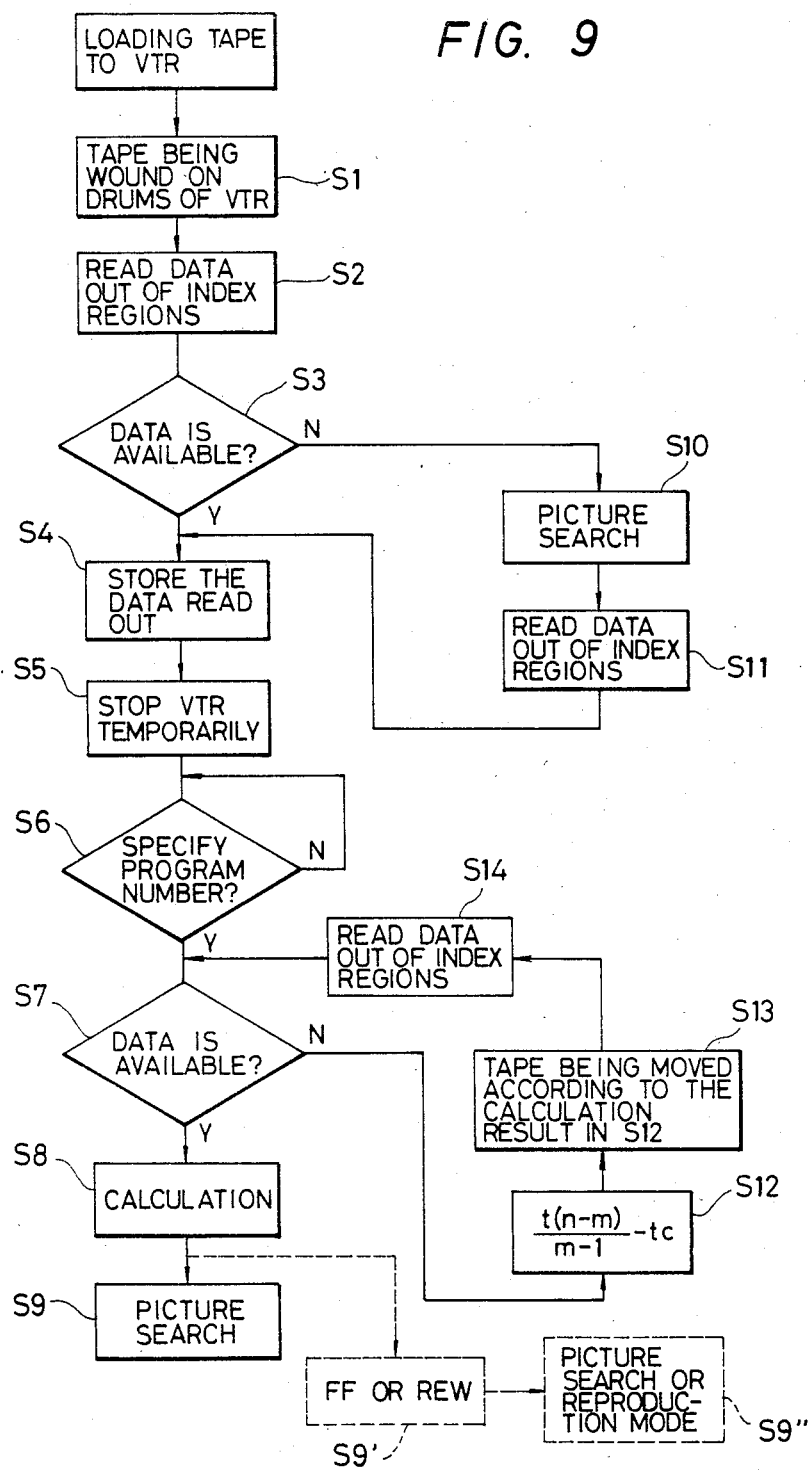

An alternative to the method described by the flow chart of FIG. 7 is shown in the flow chart of FIG. 9. The process up to Step 7 is the same as in the case of FIG. 7.

If, in Step S7, the result of the determination is "No" and no data related to the specified program is available in the memory, then in Step S12 an estimated amount of movement to the start point of the specified program is obtained according to the data in the memory. For this purpose, first an average time per program is calculated from a time required for reaching the present program from the start end of the tape and the program number. For instance, if the present program number is m and the time required for reaching the start point of the program from the start end of the tape is t, then the average time ta is $ta = t/(m-1)$ If the specified program number is n and the tape position from the start point of the present program having the program number m is tc, then the estimated amount of movement to the start point of the specified program number n can be obtained from the following expression:

$$\frac{t(n-m)}{m-1} = tc.$$

According to the result of this calculation, the tape is moved in Step S13. After the movement of the tape, the position data in the index regions is read and stored in the memory in Step S14, and the determination in Step S7 is carried out again. The operations in Steps S12, S13 and S14 are carried out repeatedly until the data of the specified program is obtained. After the data of the specified program has been obtained, the calculation in Step 8 is performed.

The tape is run in the fast forward mode through the estimated amount of movement obtained in the above-described Step S12. The amount of actual movement of the tape can be approximated from the thickness, in the radial direction, of the wound tape and the number of revolutions of the reel shaft.

As is apparent from the above description, in accordance with the method of the invention, the present program is reproduced for a predetermined time to obtain the position data of the start point of the preceding program, a calculation is performed according to the position of the start point of a specified program which occurs after the present program, and after the tape is run to the position thus estimated, the tape is subjected to reproduction again. The above-described operations are carried out repeatedly until the position data of the start point of the specified program is obtained. After the position data of the start point of the specified program is obtained, the tape is run to the start point of the specified program according to the position data thus obtained.

I claim:

1. A tape position data recording method, comprising the steps of:
   recording video program data in video tracks on a video tape; and
   recording position data related to a present program and position data related to at least one preceding program repeatedly in digital data recording tracks on extensions of video tracks in which said programs have been recorded.

2. The tape position data recording method of claim 1, further comprising the steps of:
   temporarily storing position data related to all programs recorded on said tape in memory means; and
   after all of said programs have been recorded on said tape, recording said position data stored in said memory means in digital data recording tracks provided between programs in advance and not previously used for recording.

3. In a video tape having digital data recording tracks on extensions of video tracks, the improvement wherein:
   a plurality of programs are recorded in said video tracks; and
   position data related to a present program and position data related to all programs are repeatedly recorded at predetermined positions on said digital data recording tracks on said extensions of said video tracks.

4. A method for automatically locating tops of programs recorded on a video tape, comprising the steps of:
   providing a video tape in which, in correspondence to video tracks in which a plurality of programs are recorded by rotary heads, position data related to a present program and position data related to at least one preceding program are recorded repeatedly;
   (a) reproducing said present program for a predetermined period of time to obtain for said recorded data position data of a start point of said present program,
   (b) performing a calculation according to said position data thus obtained to estimate a position of a start point of a specified program which occurs after said present program;
   (c) repeating said steps (a) and (b) until position data of a start point of the specified program is obtained; and
   (d) after said position data of said start point of said specified program is obtained, advancing said tape until said start point of said specified program is reached.

* * * * *